(12) United States Patent
Osawa et al.

(10) Patent No.: US 12,124,123 B2
(45) Date of Patent: Oct. 22, 2024

(54) DISPLAY DEVICE

(71) Applicant: Japan Display Inc., Tokyo (JP)

(72) Inventors: Shuichi Osawa, Tokyo (JP); Yoshikatsu Imazeki, Tokyo (JP); Yoichi Kamijo, Tokyo (JP); Koichi Miyasaka, Tokyo (JP); Yoshifumi Kamei, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/191,105

(22) Filed: Mar. 28, 2023

(65) Prior Publication Data
US 2023/0314866 A1 Oct. 5, 2023

(30) Foreign Application Priority Data
Mar. 31, 2022 (JP) .................................. 2022-059082

(51) Int. Cl.
*G02F 1/1335* (2006.01)
(52) U.S. Cl.
CPC .............................. *G02F 1/133514* (2013.01)
(58) Field of Classification Search
CPC ................................................ G02F 1/133514
USPC ......................................................... 349/56
See application file for complete search history.

(56) References Cited

U.S. PATENT DOCUMENTS

2008/0218461 A1* 9/2008 Sugita ............... G02F 1/133621
345/88
2018/0252964 A1* 9/2018 Nakaoka ........... G02F 1/133621

FOREIGN PATENT DOCUMENTS

WO WO-2017118085 A1 * 7/2017 ....... G02F 1/133615

* cited by examiner

*Primary Examiner* — Michael H Caley
*Assistant Examiner* — William D Peterson
(74) *Attorney, Agent, or Firm* — Michael Best & Friedrich LLP (57) ABSTRACT

According to one embodiment, a display device includes a liquid crystal display substrate and a color separation element substrate. The display substrate has a stripe structure in which different color filters are alternately arranged in a display area along a first direction and the same color filters are arranged along a second direction orthogonal to the first direction, and the different color filters are compartmentalized by frames along the first direction and the second direction. The element substrate has color separation grooves formed along the first direction in the display area, and grooves formed along the second direction in a region thereof where the color separation grooves are formed, so as to oppose the frame of the display substrate.

6 Claims, 8 Drawing Sheets

DISPLAY DEVICE

CROSS-REFERENCE TO RELATED APPLICATIONS

This application is based upon and claims the benefit of priority from Japanese Patent Application No. 2022-059082, filed Mar. 31, 2022, the entire contents of which are incorporated herein by reference.

FIELD

Embodiments described herein relate generally to a display device that uses technology of color separation element.

BACKGROUND

Display devices of a color filter (CF) type, used in liquid crystal display modules comprise a liquid crystal panel (a panel in which a CF substrate is stacked on a thin-film-transistor (TFT) substrate) in which CFs of RGB are formed in pixel units. In such devices, white backlight from a light source is made incident on the filters of the respective RGB pixels in accordance with the image to be displayed, thereby allowing light of wavelengths of the CF colors to pass through and absorbing light of wavelengths other than the CFs. Due to this configuration, light utilization efficiency is low. Under such circumstances, in order to enhance the light utilization efficiency, the technology of light separation element has been proposed.

The color separation element technology uses a color separation element with color separation grooves formed by a predetermined pattern of irregularities on the surface of a glass substrate, which diffract and separate the incoming white backlight in a specific direction for each respective RGB wavelength component. According to this technology, in a CF-type display device, a glass substrate on which the above-described color separation element is formed (which is to be referred to as "color separation element substrate" hereinafter) is placed between to the light source of the backlight and the TFT substrate so as to oppose thereto. Then, the backlight is separated by the color separation element into wavelengths corresponding to respective CFs of RGB and diffracted in specified directions to allow only light with wavelengths corresponding to CF to enter the filters of the respective RGB pixels via the TFT substrate. With this configuration, the absorption of light other than the wavelength corresponding to the CFs is reduced, thereby improving the utilization efficiency of light (luminance).

Note here that the RGB arrangement of the CFs is a stripe arrangement in which CFs are arranged in a predetermined order in one direction on the screen whereas those of the same color are in the other direction, and in accordance with this arrangement, the color separation grooves of the color separation element substrate are formed to have a stripe configuration in which a plurality of uneven patterns are arranged in one direction and in the other direction, the same pattern continues.

However, in a display device of the above-described configuration, the CFs of RGB are each arrayed to be separated by a frame, whereas the color separation grooves of the color separation element substrate are continuous. With this configuration, separation light is shielded in the frame area on the CF side. The frame described here is assumed to be equivalent to, for example, the conventionally known black matrix that is formed on a CF substrate so as to compartmentalize pixels from each other.

DETAILED DESCRIPTION

In general, according to one embodiment, a display device a display device includes a liquid crystal display substrate and a color separation element substrate bonded together by peripheral portions with a bonding layer thereof to have a predetermined thickness. The liquid crystal display substrate has a stripe structure in which different color filters are alternately arranged in a display area along a first direction and the same color filters are arranged along a second direction orthogonal to the first direction, and the different color filters are compartmentalized by frames along the first direction and the second direction. The color separation element substrate is disposed to oppose the liquid crystal display substrate, in which color separation grooves are formed to separate backlight from a light source made incident thereon according to wavelengths of the different colors of the plurality of color filters by a concave-convex pattern of grooves formed along the first direction in the display area, and output light of the wavelength for each separated color toward the color filter of the respective corresponding color. The color separation element substrate has grooves formed along the second direction in a region thereof where the color separation grooves are formed, so as to oppose the frame of the liquid crystal display substrate.

According to the above configuration, the shielding of the color separation light in the frame region on the color filter side can be suppressed, thereby making it possible to improve the efficiency of utilization of light.

Various embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First, the color separation element applied to this embodiment will be described with reference to FIGS. 7, 8A and 8B.

Figure 7:
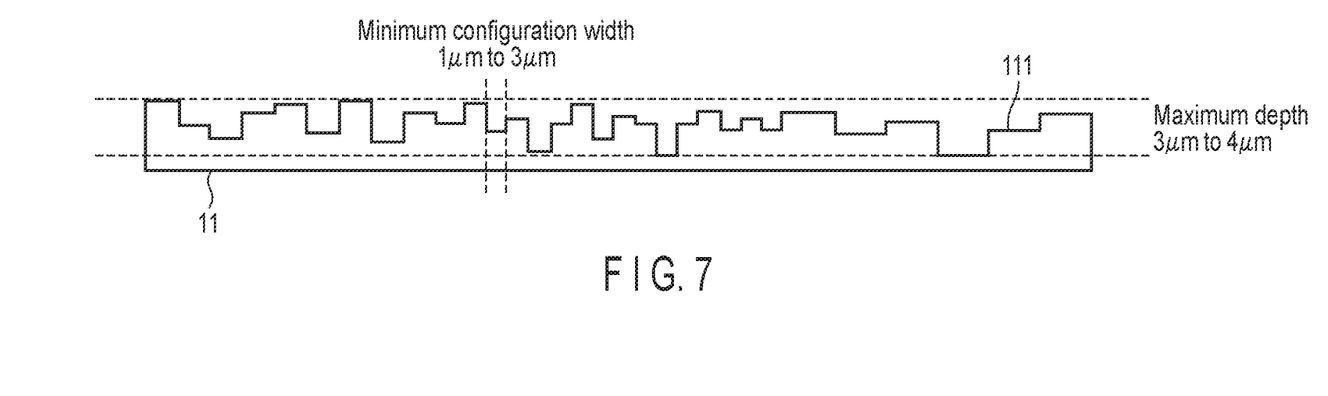
FIG. 7 is a cross-sectional showing a specific configuration of a color separation element substrate to be applied to the embodiment.
Figure 8A:
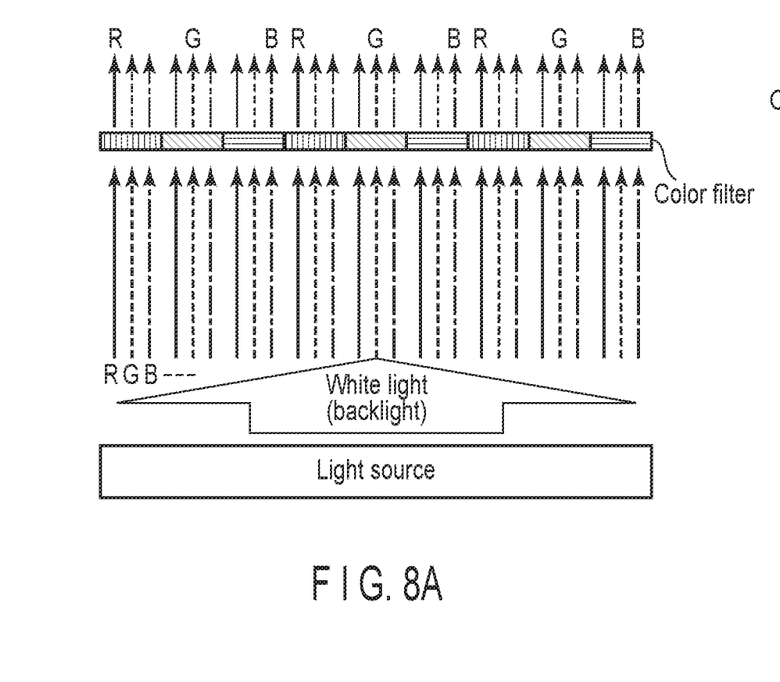
FIGS. 8A and 8B are cross-sectional views showing specific examples of color separation process of the color separation element shown in FIG. 7.
Figure 8B:
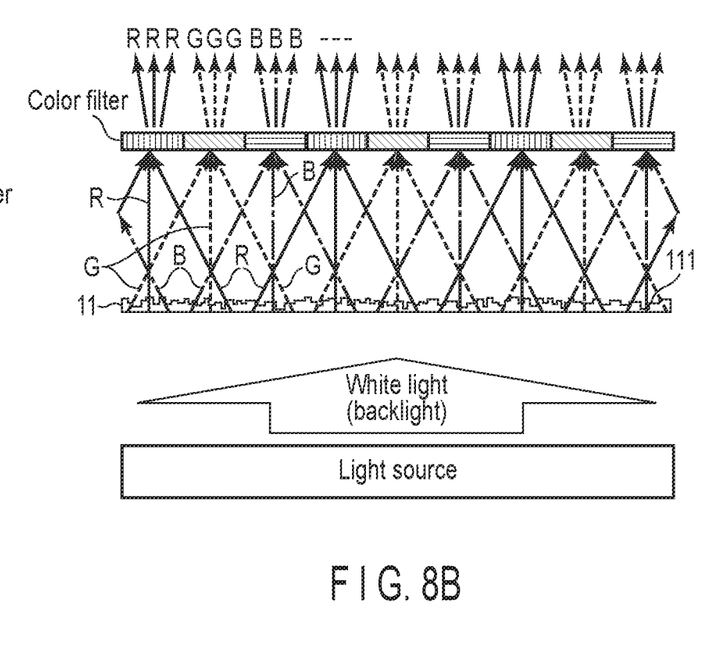

FIG. 7 is a cross-sectional view showing a specific structure of the color separation element, and FIGS. 8A and 8B are cross-sectional views showing examples of color separation of backlight by the color separation element shown in FIG. 7.

That is, as shown in FIG. 7, the color separation element is a glass substrate in which grooves with a minimum structural width of 1 µm to 3 µm and a maximum depth of 3 µm to 4 µm is formed in a predetermined pattern corresponding to RGB. Hereafter, the above-described grooves are referred to as color separation grooves 111. The glass substrate on which the color separation grooves 111 are formed is referred to as a color separation element substrate 11.

When backlight (white light) irradiated from a light source is made incident directly as it is on color filters, light other than R, G and B is absorbed by R, G and B filters, respectively, as shown in FIG. 8A. In contrast, when backlight (white light) is made incident on the color filters via the color separation element substrate 11, the R, G, and B components of the light are diffracted in different directions and focused on the respective color filters, as shown in FIG. 8B. In this manner, light absorption in the color filters can be reduced, thereby making it possible to improving the utilization efficiency of light (luminance).

An embodiment of a display device which employs the above-described color separation element substrate 11 will now be described. In the following description, the display screen is assumed to be wide in horizontal direction, and the long direction is referred to as the horizontal direction and the short direction as the vertical direction. Further, R, G and B regions of CFs are arranged repeatedly along the horizontal direction and also consecutively provided in the vertical direction, respectively. When the display screen is set vertical and the long direction is referred to as the vertical direction and the short direction as the horizontal direction, the configuration and its effects of the embodiment are the same.

First Embodiment

Figure 1:
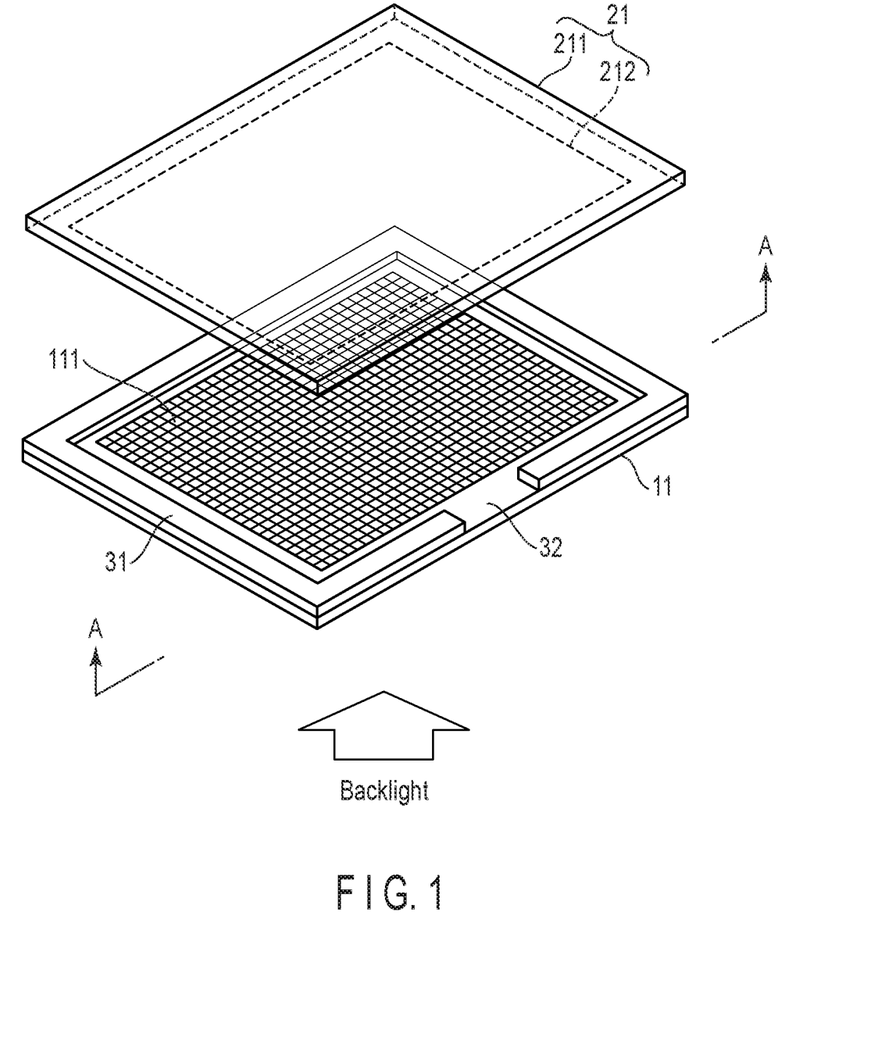
FIG. 1 is an exploded perspective view showing a basic configuration of a display device according to the first embodiment.
Figure 2:
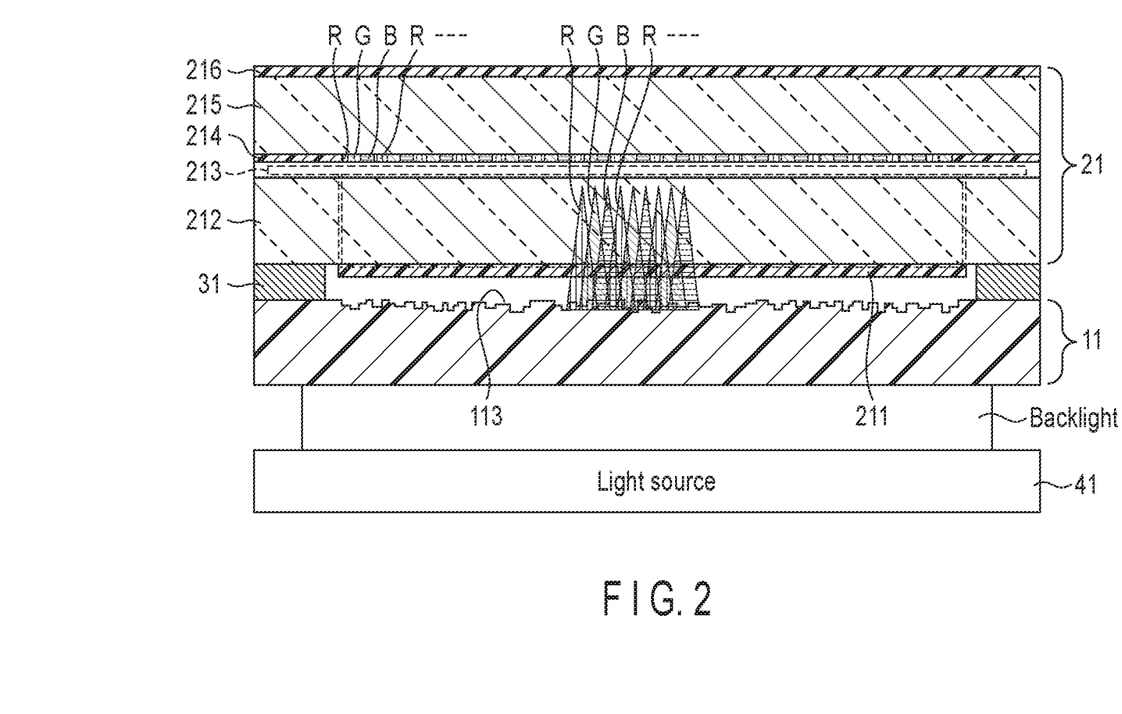
FIG. 2 is a cross-sectional view showing a stacked layer structure of the display device of the first embodiment.

FIG. 1 is an exploded perspective view showing a basic configuration of the display device according to the first embodiment, FIG. 2 is a cross-sectional view showing a stacked layer structure of the display device taken along line A-A in FIG. 1, and FIG. 3 is a front view showing a configuration of the color separation element substrate of the display device according to the embodiment as compared to the conventional configuration. The display device shown in FIGS. 1 and 2 has a stacked layer structure in which the color separation element substrate 11 and a liquid crystal panel 21 are bonded together via a double-sided tape or a sealant layer 31 so as to have a constant thickness.

Figure 3A:
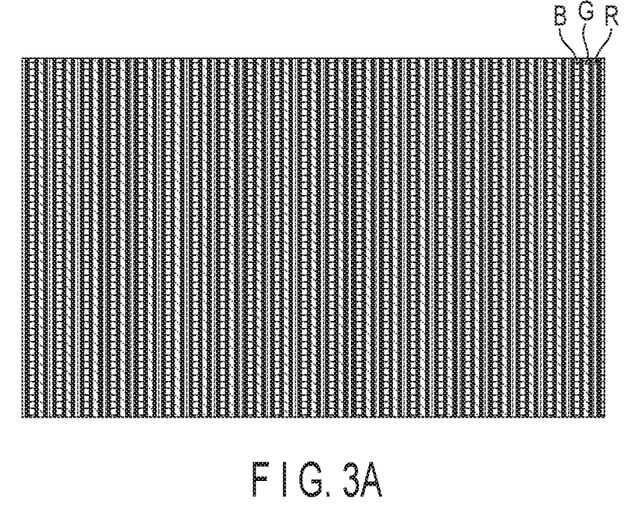
FIGS. 3A and 3B are each a front view showing a configuration of a color separation element substrate of the display device of the first embodiment in comparison with a conventional configuration.
Figure 3B:
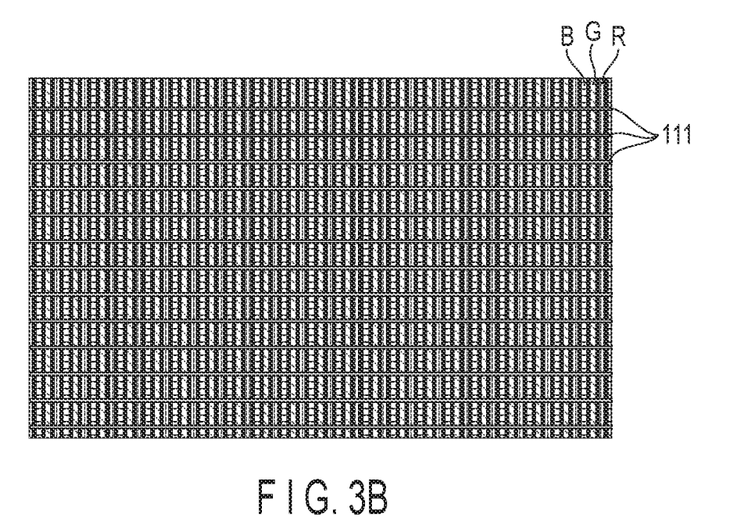

First, in the color separation element substrate 11, a junction area of a certain width is secured I in a peripheral portion thereof, and the color separation grooves 111 are formed in the display effective area on an inner portion of an upper surface. In the conventional structure, the color separation grooves 111 are formed to have a stripe structure in which the depth of the grooves is vertically continuous, as shown in FIG. 3A. By contrast, in this embodiment, as shown in FIG. 3B, a matrix structure is adopted in which grooves which compartmentalize pixel regions (pixel division) from each other are formed along the horizontal direction in addition to those of the vertical direction.

On the other hand, the liquid crystal panel 21 has a structure in which, in order from the incident side of the backlight irradiated from the light source 41, a lower polarizer 211, a TFT substrate 212, a liquid crystal layer 213, a CF layer 214, a CF glass substrate 215, and an upper polarizer 216 are stacked. The TFT substrate 212 includes a junction area of a certain width from a peripheral edge thereof on an incident surface side of the backlight. To the display effective area on an inner side the junction area, the lower polarizer 211 is attached.

Further, although a detailed explanation thereof will not be provided, pixel TFTs each provided for a plurality of pixels on the glass substrate are formed on the TFT substrate 212. The CF glass substrate 215 including the CF layer 214 is referred to as a CF substrate. The TFT substrate 212 and the CF substrate are bonded by a sealant layer, and the sealant layer seals the liquid crystal layer 213 between the TFT substrate 212 and the CF substrate.

In a portion of the above-described sealant layer 31 which bonds the liquid crystal panel 21 and the color separation element substrate 11 together, a notch portion, which is an air hole 32, is formed. The air hole 32 function as a measure to prevent condensation in the interior space, that is, preventing the interior from fogging (condensation) due to a temperature difference between the exterior of the display device and the portion between the color separation element substrate 11 and the lower polarizer 211.

Figure 4A:
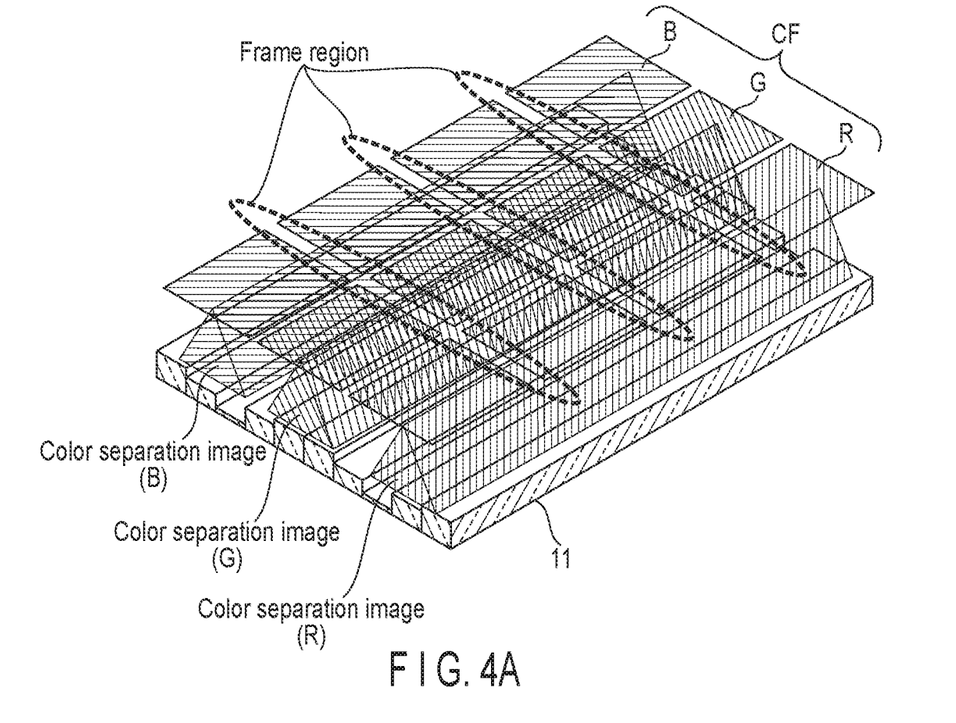
FIGS. 4A and 4B are each a perspective view showing how color separation light of the color separation element substrate of the display device according to the first embodiment is focused on a CF in comparison with a conventional configuration.
Figure 4B:
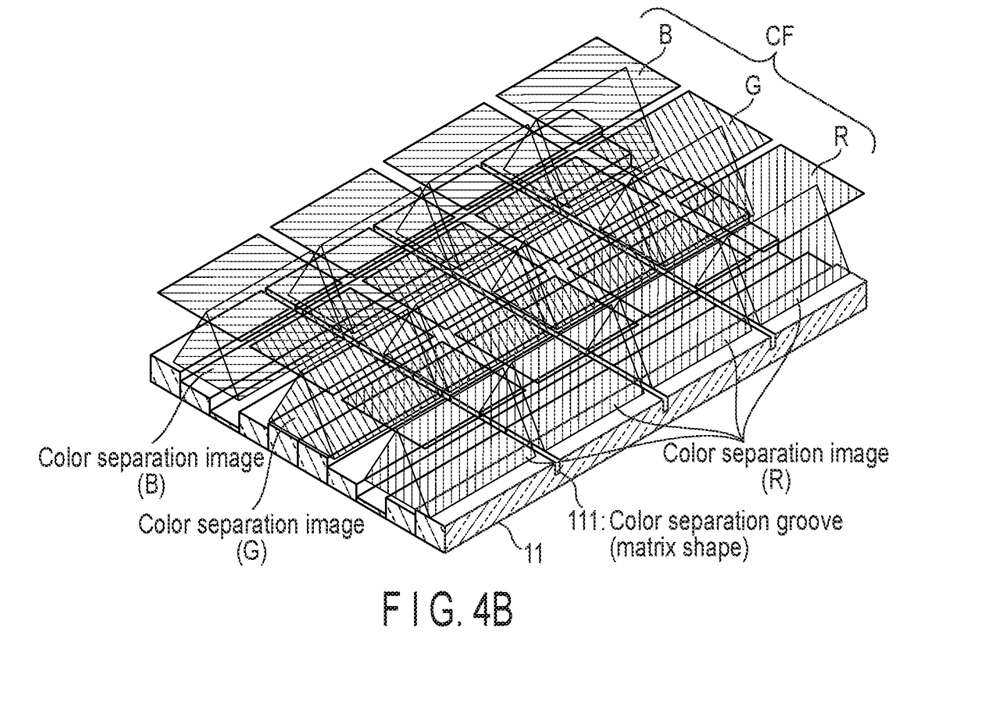

The following is an explanation of the operational effects of the display device of the above-described configuration in comparison with the conventional case with reference to FIGS. 4A and 4B.

FIGS. 4A and 4B each show how the color separation light is focused on the CFs in the color separation element substrate of the display device of the embodiment, and FIGS. 4A and 4B are diagrams schematically showing the conventional structure and the structure of the embodiment, respectively.

In the conventional structure, the color separation grooves 111 are formed consecutively only in the vertical direction, and therefore the light focused on the RGB effective area also hits parts of the frame area other than the RGB effective area of the CFs, and those parts do not contribute to improvement in luminance. Under these circumstances, further improvement in luminance is attempted by focusing light that does not contribute to the improvement in luminance onto the RGB effective area.

In order to achieve this, in this embodiment, as shown in FIG. 3B, when forming the grooves, the color separation grooves 111 are formed into a matrix structure in which grooves that compartmentalize the pixel regions in the horizontal direction in addition to those of the vertical direction. As a result, as shown in FIG. 4B, the light hitting the frame region of the CF is refracted by the grooves formed along the horizontal direction and concentrated onto the RGB effective area, thus increasing the effective utilization of color separation light and contributing to the improvement in luminance.

Second Embodiment

Figure 5A:
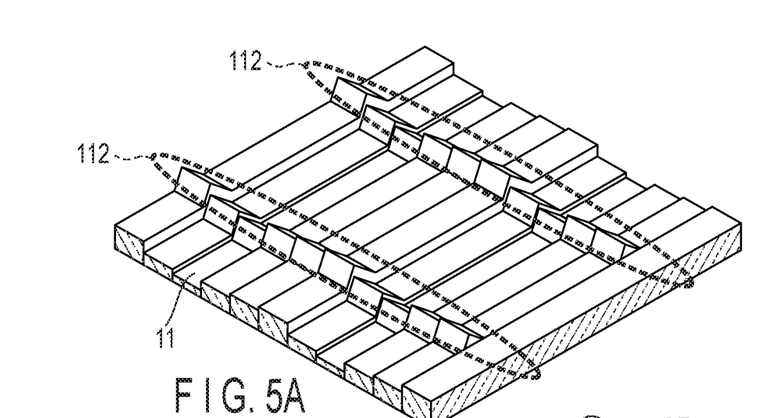
FIGS. 5A, 5B and 5C are, respectively, perspective, cross-sectional and conceptual views showing a configuration of a color separation element substrate of a display device according to the second embodiment.
Figure 5B:
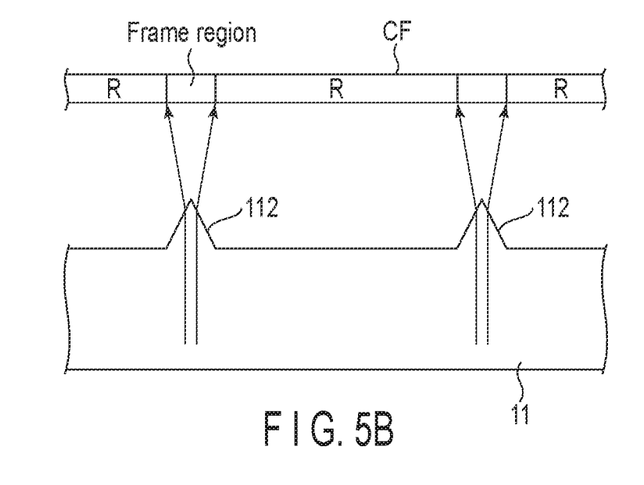
Figure 5C:
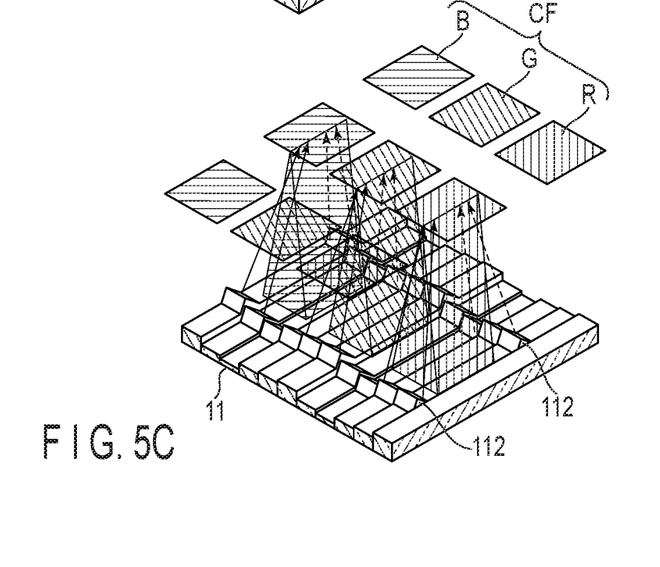

With reference to FIGS. 5A, 5B and 5C, the second embodiment will be described. FIG. 5 are each a perspective view showing the structure of a color separation element substrate of a display device of the second embodiment, and FIG. 6 is a conceptual diagram showing an example of light concentration of the color separation element substrate shown in FIG. 5.

In the first embodiment, matrix-like color separation grooves 111 are formed to compartmentalize the pixel regions from each other along the horizontal direction as well as the vertical direction, in the color separation element substrate 11. By contrast, in the second embodiment, as shown in FIG. 5A, mountain-shaped tapers 112 are formed in place of grooves that compartmentalize the pixel regions along the horizontal direction. As shown in FIG. 5B, the tapers 112 each have slopes to compartmentalize the pixel regions, and thus transmitted light is output toward each of the RGB regions of the CFs. In this manner, as shown in FIG. 5C, the light hitting the frame region of the CF is now concentrated in the RGB effective area, thereby resulting in an increase in luminance.

Third Embodiment

Figure 6:
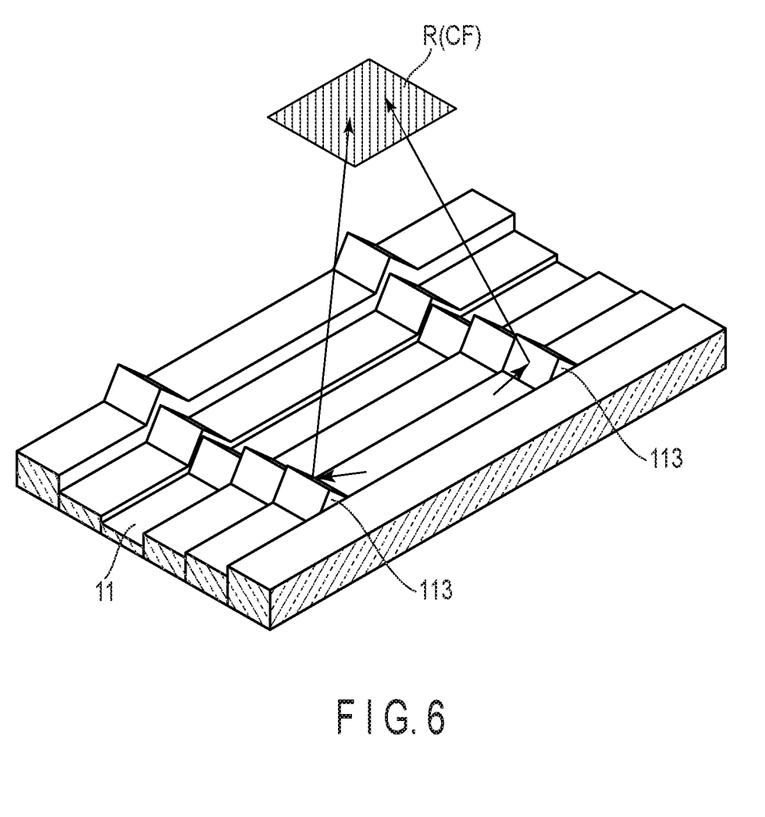
FIG. 6 is a perspective view showing a configuration of a color separation element substrate of a display device according to the third embodiment.

With reference to FIG. 6, the third embodiment will now be described. FIG. 6 is a perspective view showing the structure of a color separation element substrate 11 of the display device of the third embodiment.

Note that in the first embodiment, matrix-like color separation grooves 111 are formed to compartmentalize the pixel regions along the horizontal direction as well as the vertical direction in the color separation element substrate 11, and in the second embodiment, the glass substrate is molded to form mountain-shaped tapers 112 in place of the horizontal grooves of the first embodiment. By contrast, in the third embodiment, as shown in FIG. 6, metal film tapers 113 are formed by depositing a metal film on the surface of each of the tapers 112 horizontally formed in the second embodiment.

The thus formed metal film tapers 113, as shown in FIG. 6, causes scattered components of the transmitted light to be brought together and output to each of the RGB areas of the CFs due to the slopes of the tapers 113 that compartmentalize the pixel regions. As a result, as shown in FIG. 6, the light hitting the frame areas of the CFs is now concentrated in the RGB effective area, resulting in an increase in luminance. With this structure, by forming the surface of each taper with a metal film, scattered light from the liquid crystal panel 21 and the color separation element substrate 11 can also be efficiently concentrated on each RGB pixel.

As described above, according to the display devices of the embodiments, the color separation light that has been shielded by the frame area on the CF side can now be focused to the RGB effective area, thereby improving the light utilization efficiency.

In the above-provided embodiments, both the color separation element substrate and the liquid crystal TFT substrate are processed from glass materials, but transparent materials such as resin may as well be used.

Apart from the above, the present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
a liquid crystal display substrate having a stripe structure in which a plurality of color filters of different colors are alternately arranged in a display area along a first direction and a plurality of color filters of a same color are arranged along a second direction orthogonal to the first direction, and including a frame that divides the display area in units of pixels in the first direction and the second direction to form pixel effective regions, in which the plurality of color filters are arranged in different colors in the first direction in pixel effective regions arranged in the first direction, respectively, in the pixel effective regions aligned in the second direction, and the color filters of the plurality of colors are arranged in a same arrangement as the pixel effective regions adjacent to each other along the second direction;
a color separation element substrate disposed to oppose the liquid crystal display substrate, in which color separation grooves are formed to separate backlight from a light source made incident thereon according to wavelengths of the different colors of the plurality of color filters by a concave-convex pattern of grooves formed along the first direction in an area where light is emitted to the display area of the liquid crystal display substrate, and output light of the wavelength for each separated color toward the color filter of the respective corresponding color, in which refraction grooves are formed in the area in which the color separation grooves are formed so as to separate in the second direction, so that light proceeding toward a frame separating in the second direction is refracted toward adjacent pixel effective regions aligned in the second direction; and
a bonding layer that bonds the liquid crystal display substrate and the color separation element substrate by peripheral portions thereof to have a predetermined thickness.

2. The display device of claim 1, wherein
the color separation grooves formed along the first direction and the refraction grooves formed along the second direction in the color separation element substrate have a matrix structure that compartmentalizes pixel effective regions of the liquid crystal display substrate.

3. A display device comprising:
a liquid crystal display substrate having a stripe structure in which a plurality of color filters of different colors are alternately arranged in a display area along a first direction and a plurality of color filters of a same color are arranged along a second direction orthogonal to the first direction, including a frame that divides the display area in units of pixels in the first direction and the second direction to form pixel effective regions, in which the plurality of color filters are arranged in different colors along the first direction in pixel effective regions arranged in the first direction, respectively, and in the pixel effective regions aligned in the second direction, the color filters of the plurality of colors are arranged in a same arrangement as that of the pixel effective regions adjacent to each other along the second direction;

a color separation element substrate disposed to oppose the liquid crystal display substrate, in which color separation grooves are formed to separate backlight from a light source made incident thereon according to wavelengths of the different colors of the plurality of color filters by a concave-convex pattern of grooves formed along the first direction in an area where light is emitted to the display area of the liquid crystal display substrate, and output light of the wavelength for each separated color toward the color filter of the respective corresponding color, in which refraction tapers are formed in the area in which the color separation grooves are formed so as to separate in the second direction, so that light proceeding toward a frame separating in the second direction is refracted toward the adjacent pixel effective regions aligned in the second direction; and a bonding layer that bonds the liquid crystal display substrate and the color separation element substrate by peripheral portions thereof to have a predetermined thickness.

4. The display device of claim 3, wherein
the color separation grooves formed along the first direction and the refraction tapers formed along the second direction in the color separation element substrate have a matrix structure that compartmentalize pixel effective regions of the liquid crystal display substrate.

5. A display device comprising:
a liquid crystal display substrate having a stripe structure in which a plurality of color filters of different colors are alternately arranged in a display area along a first direction and a plurality of color filters of a same color are arranged along a second direction orthogonal to the first direction including a frame that divides the display area in units of pixels in the first direction and the second direction to form pixel effective regions, in which the plurality of color filters are arranged in different colors in the first direction in pixel effective regions arranged in the first direction, and in the pixel effective regions aligned in the second direction, the color filters of the plurality of colors are arranged in a same arrangement as that of the pixel effective regions adjacent to each other along the second direction;

a color separation element substrate disposed to oppose the liquid crystal display substrate, in which color separation grooves are formed to separate backlight from a light source made incident thereon according to wavelengths of the different colors of the plurality of color filters by a concave-convex pattern of grooves formed along the first direction in an area where light is emitted to the display area of the liquid crystal display substrate, and output light of the wavelength for each separated color toward the color filter of the respective corresponding color, tapers with a metal film are formed in the area in which the color separation grooves are formed so as to separate in the second direction, so that light proceeding toward a frame separating in the second direction is refracted toward the adjacent pixel effective regions aligned in the second direction; and a bonding layer that bonds the liquid crystal display substrate and the color separation element substrate by peripheral portions thereof to have a predetermined thickness.

6. The display device of claim 5, wherein
the color separation grooves formed along the first direction and the tapers formed along the second direction in the color separation element substrate have a matrix structure that compartmentalize pixel effective regions of the liquid crystal display substrate.

\* \* \* \* \*